M. HARRIS.
CONDENSERS FOR STILLS AND DRYING-CHAMBERS.
No. 170,730. Patented Dec. 7, 1875.
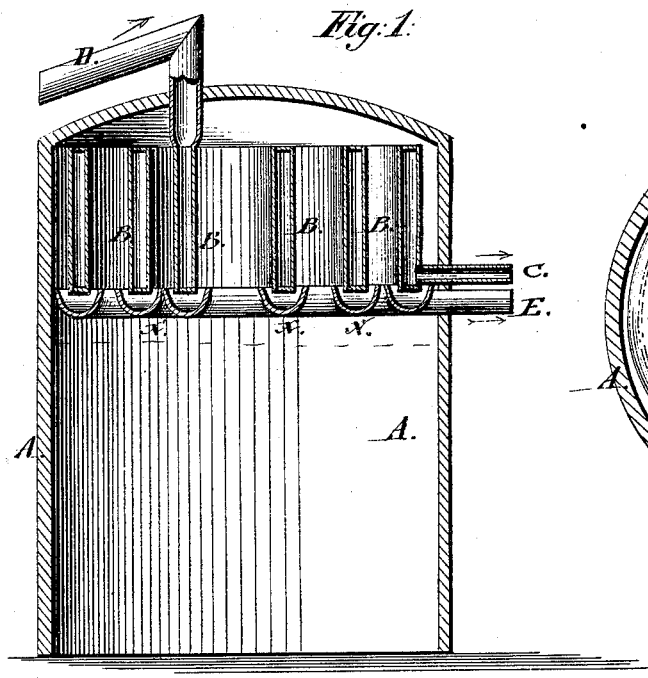
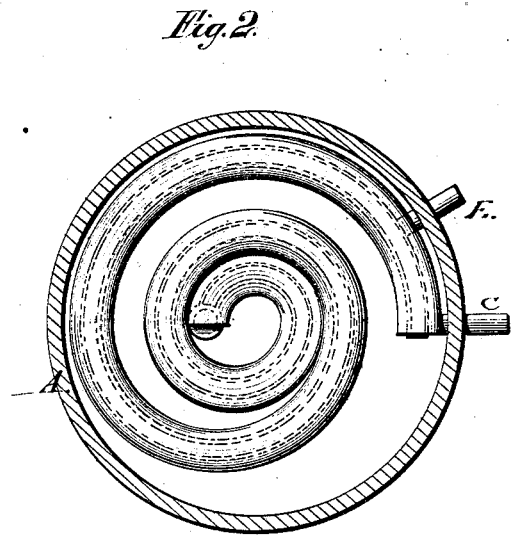
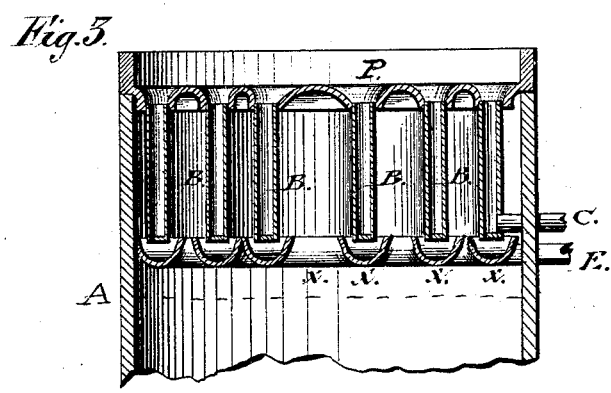
Attest:
Edw. W. Donn
M. Gardner
Inventor:
Milo Harris

UNITED STATES PATENT OFFICE.

MILO HARRIS, OF JAMESTOWN, NEW YORK.

IMPROVEMENT IN CONDENSERS FOR STILLS AND DRYING-CHAMBERS.

Specification forming part of Letters Patent No. 170,730, dated December 7, 1875; application filed November 22, 1875.

*To all whom it may concern:*

Be it known that I, MILO HARRIS, of Jamestown, in the county of Chautauqua and State of New York, have invented certain new and useful Improvements in Condensers for Stills and Drying-Chambers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to furnish a condenser for stills and drying-chambers; and consists in making and placing a wide, flat, and coiled or rabbeted tube or tubes edgewise in the top of a still or drying-chamber, in such a manner that when cold water is forced through the tube it forms a steady and efficient condensing-surface to condense the vapors, while a trough underneath catches and conveys out of the still or chamber the condensation. I will describe its operation and effects when used in coal-oil stills. In most coal-oil stills the vapors are forced out through a sort of half-inverted bell-shaped conductor into a pipe leading to the worm or cooler, while some have one or more pipes in the top of the still leading directly to the cooler. In each case the vapors are forced out by gas generated by great heat in the still through these small apertures, and consequently the process is not only slow, but causes great strain on the walls of the still, and many times the oil is discolored by the vapors coming in contact with the heated walls of the still above the oil, thereby making it of inferior quality and less salable. To overcome these objections various methods of condensing have been devised. Heretofore, when condensing-surfaces have been employed for this purpose they have either been made by the wall or covering of the still, or the vapors have come in direct contact with water to condense them. The objection to the first is, that the stills have to be made expressly with reference to their condensing-cover or walls, and are not only costly, but their condensing-surfaces are limited to such covering or wall, while the objection to the latter is its inefficiency and the expense and trouble to again separate the oil from the water.

It will readily be seen that my improvement entirely overcomes these objections, as it may be put in any common still at a small expense, and by using the wide, flat tube the condensing-surface can be of any desired capacity, and being just above the oil the vapors do not have to be raised as high, but as fast as formed are condensed and carried immediately out of the still, and there is no mingling of the oil with water.

In the accompanying drawings, Figure 1 is a vertical central section. Fig. 2 is plan or horizontal section looking up from the bottom, (somewhat distorted.) Fig. 3 is a partial sectional view, showing a modification.

A is the wall or side of an upright still, made of iron or other metal in the usual way. B is the condensing-tube, made of suitable sheet metal, or may be made of cast-iron in sections, and bolted together, and when used in a common-sized still should be from twelve to twenty inches wide, and about one inch space between the sides. This tube is made in the form of a coil, having the inner end of the coil the highest, and comes near the center at the top of the still, while its outer end comes close to the wall of the still, and has a pipe, C, that extends from it through the wall A, while a pipe, D, is secured to its inner end, and passes out through the top of the still. X is a spiral trough hung directly underneath the tube B, so as to catch the condensed vapors from both its sides, and has inclination from its inner to its outer end, so as to readily discharge its contents through the pipe E, which conveys the condensation directly to the worm or cooler. The same result would be obtained by placing the flat tube B back and forth across the top of the still; but I prefer the spiral form, as one trough will carry away the condensation, and is cheaper constructed.

Fig. 3 shows the same flat tubes made in the cover P of a still, having openings at the top to receive the water, while the sides are extended, so as to hold more water. This form would perhaps be cheaper when new stills are to be constructed. It will readily be seen that the flat condensing-tube B made in this form can be so extended that a very large amount of condensing-surface can be got in a small space, and as the condensation only has to pass across the tube its efficiency is much greater than on condensers where long pipes or roof-surfaces have to be passed before reaching the trough.

The practical operation is as follows: The still is filled with crude oil nearly to the trough X, and heated in the usual manner. A stream of cold water is forced into the condensing-tube B through the pipe C, and passed out at D in such quantities as to keep a uniform and efficient condensing-surface. As soon as the oil is heated so as to become vaporized it rises, and, coming directly in contact with the cold tube B, is condensed and falls into the trough X, and is carried at once out of the still to the cooler. As the vapors are collected and carried out of the still as fast as formed there is no extra pressure on the still, the oil is never discolored by the heated walls of the still, and I am able to run off nearly or quite as much oil in twelve hours as in twenty-four in the old way, thereby saving one-half the fuel and the expense of help, besides the extra hazard of fire caused by running nights.

Having described my invention, what I claim is—

1. The combination, in an evaporating-chamber, of a spiral or rabbeted condenser, having a longer vertical than horizontal dimension in its cross-section, and having its inlet and outlet extended outside of the chamber, with a correspondingly spiral or rabbeted trough, to catch and convey the condensation, as and for the purpose set forth.

2. The combination of the evaporating-chamber A, spiral cup-condenser B, having outlet C, apertured cover D, and trough X, all arranged as and for the purpose set forth.

In testimony that I claim the foregoing as my own I affix my signature in presence of two witnesses.

MILO HARRIS.

Witnesses:
CHAS. H. MOULTON,
F. P. MULLOY.